United States Patent
Okamura

(10) Patent No.: US 11,587,309 B2
(45) Date of Patent: Feb. 21, 2023

(54) OBJECT DETECTION SYSTEM, OBJECT DETECTION DEVICE, AND OBJECT DETECTION METHOD

(71) Applicant: TOSHIBA TEC KABUSHIKI KAISHA, Tokyo (JP)

(72) Inventor: Atsushi Okamura, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 71 days.

(21) Appl. No.: 17/349,886

(22) Filed: Jun. 16, 2021

(65) Prior Publication Data
US 2022/0051019 A1 Feb. 17, 2022

(30) Foreign Application Priority Data
Aug. 12, 2020 (JP) .............................. JP2020-136349

(51) Int. Cl.
*G06V 20/10* (2022.01)
*H04N 5/247* (2006.01)
*G06K 9/62* (2022.01)
*H04N 13/204* (2018.01)
*H04N 5/232* (2006.01)
*G08B 5/36* (2006.01)

(52) U.S. Cl.
CPC ............ *G06V 20/10* (2022.01); *G06K 9/6256* (2013.01); *H04N 5/232* (2013.01); *H04N 5/247* (2013.01); *H04N 13/204* (2018.05); *G08B 5/36* (2013.01)

(58) Field of Classification Search
CPC ........ G06V 20/10; G06V 20/52; G06V 10/82; G06K 9/6256; H04N 5/232; H04N 5/247; H04N 13/204; G08B 5/36; G08B 13/1481; G08B 21/24; G06T 2207/10012; G06T 2207/10028; G06T 2207/20076; G06T 2207/20081; G06T 7/70; G06T 7/0002
USPC ......................................................... 382/103
See application file for complete search history.

(56) References Cited

U.S. PATENT DOCUMENTS

| | | | |
|---|---|---|---|
| 2008/0291438 A1* | 11/2008 | Akkerman | G01N 21/9036 356/240.1 |
| 2019/0197466 A1* | 6/2019 | Hand, III | H04N 7/185 |
| 2020/0182836 A1* | 6/2020 | Werk | G01N 15/10 |

FOREIGN PATENT DOCUMENTS

JP     2012-251900 A     12/2012

* cited by examiner

*Primary Examiner* — Stephen P Coleman
(74) *Attorney, Agent, or Firm* — Kim & Stewart LLP

(57) ABSTRACT

An object detection system includes a first detection device configured to control a first camera to acquire a first image of a container and detect an object in the container based on the first image, and a second detection device configured to control a second camera to acquire a second image of the container. The second image is a more detailed or accurate image than the first image for detecting the object in the container based on the second image. The first detection device is further configured to train a learning model for detecting the object in the container based on the first image using detection results from the second detection device as an indication of the correct result, and then use the trained learning model for detecting the object in the container based on the first image.

20 Claims, 4 Drawing Sheets

OBJECT DETECTION SYSTEM, OBJECT DETECTION DEVICE, AND OBJECT DETECTION METHOD

CROSS-REFERENCE TO RELATED APPLICATION

This application is based upon and claims the benefit of priority from Japanese Patent Application No. 2020-136349, filed on Aug. 12, 2020, the entire contents of which are incorporated herein by reference.

FIELD

Embodiments described herein relate generally to an object detection system, an object detection device, and an object detection method.

BACKGROUND

A box-shaped container referred to as a returnable container is used for transporting a commodity, a component, a material, a product, a document or the like between distribution centers. For example, such a container for transport is used when a commodity is shipped from a warehouse to a store. That is, at the time of shipment, the commodity is packed into the container for transport and carried out of the warehouse to the store. On completion of the shipment, the container for transport, which is now empty, is returned from the store to the warehouse. Then, another commodity is packed into this container for transport and carried out of the warehouse to the store.

In such use of the container for transport, if a commodity is left behind in the container in the course of taking out the commodity from the container at the store, this commodity is returned as a left-behind object to the warehouse. If a worker at the warehouse packs another commodity into the container without being aware of the left-behind object, the left-behind commodity is shipped to the store improperly. To avoid such trouble, a mechanism to check whether there is a left-behind object in a container needs to be provided at least at one point in the distribution path. To this end, a system that can detect a left-behind object in a container at low cost and with high accuracy is desired.

DETAILED DESCRIPTION

One or more embodiments described herein provide a low-cost and high-accuracy object detection system that can detect when an object has been left in a container.

In general, according to one embodiment, an object detection system includes a first detection device configured to control a first camera to acquire a first image of a container, and detect an object in the container based on the first image, and a second detection device configured to control a second camera to acquire a second image of the container, the second image including more data than the first image, detect the left-behind object in the container based on the second image, and output a detection result of the left-behind object. The first detection device is further configured to train a learning model for detecting the left-behind object in the container based on the first image, and use the trained learning model for detecting the object in the container based on the first image.

One or more example embodiments will now be described with reference to the drawings.

In an embodiment, a transport container that can be used when shipping a commodity from a warehouse to a store is an evaluation target of a left-behind object detector or a system incorporating such a detector. A left-behind object detection system that can detect an object that has been inadvertently left in a transport container before is the container is packed with new items at the warehouse is described as one example. That is, in an example, the detection system checks whether a transport container that is expected to be empty (nominally empty) is actually empty prior to a start of packing the transport container with new items.

Figure 1:
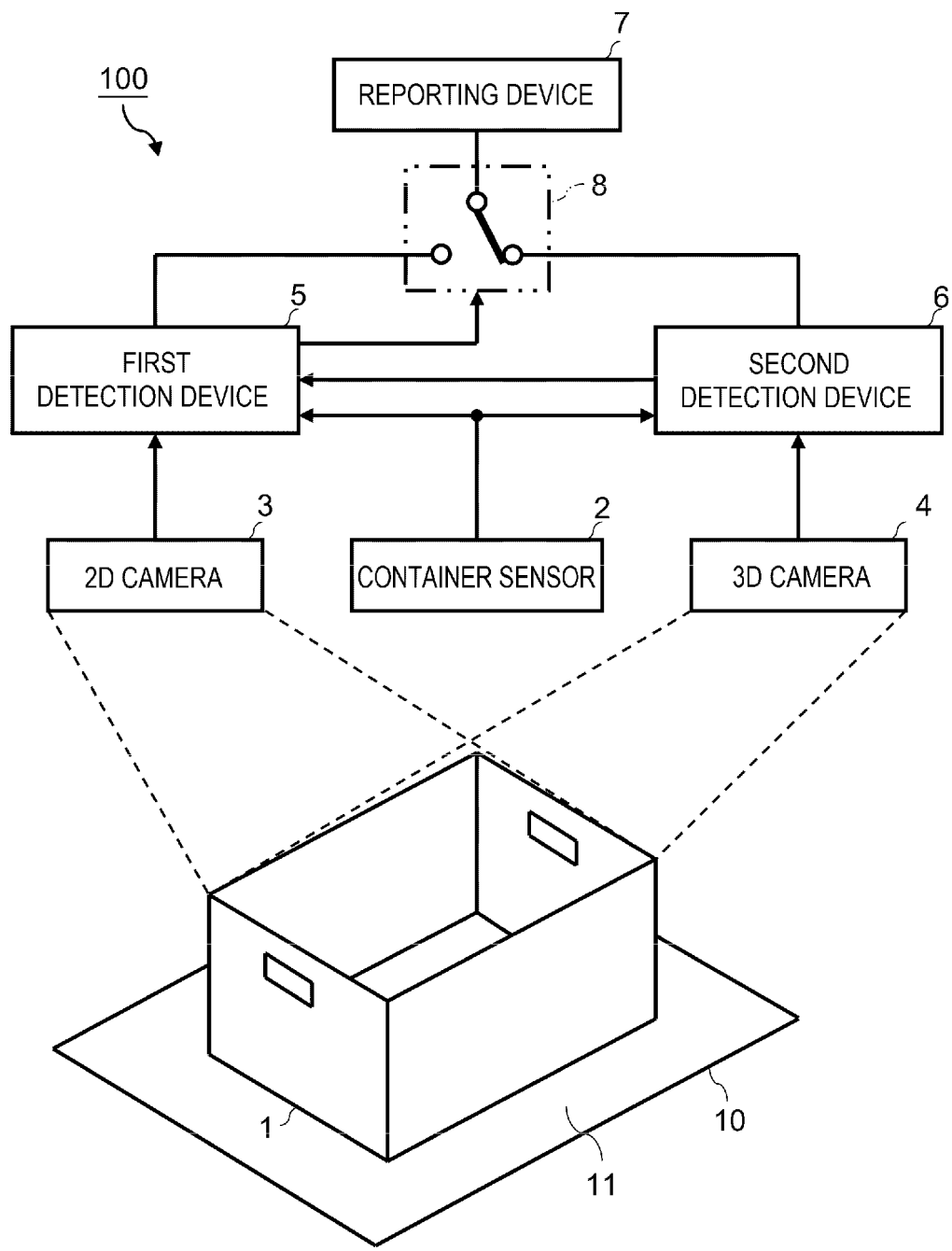
FIG. 1 is a block diagram of a left-behind object detection system according to an embodiment.

FIG. 1 is a block diagram showing a left-behind object detection system 100 according to an embodiment. The left-behind object detection system 100 has at least a container sensor 2, a two-dimensional (2D) camera 3, a three-dimensional (3D) camera 4, a first detection device 5, a second detection device 6, a reporting device 7, and a switch 8 in order to detect a left-behind object such as a commodity left behind in a container 1 for transport.

The container sensor 2 is a sensor for detecting whether the container 1 (also referred to as a transport container 1, a shipping container, a shipping box, shipping carton, or the like) is present in a predetermined inspection area 10. The container sensor 2 outputs a detection signal to the first detection device 5 and the second detection device 6 every time the container sensor 2 detects that a container 1 has been placed in the inspection area 10.

The inspection area 10 includes a placement surface 11 on which the bottom surface of the container 1 can be placed. In this example, just one container 1 can be placed within the placement surface 11. That is, in this example, two or more containers 1 cannot be placed next to each other on the placement surface 11.

The container 1 is in the shape of a rectangular parallelepiped with a rectangular bottom face, four lateral faces standing upright, and an open top face. However, the shape of the container 1 is not particularly limited. The container 1 may be any container with at least at one open face.

The method for transporting the container 1 to the inspection area 10 is not particularly limited. A conveyor (e.g., a conveyor belt) or the like may be used to automatically place the container 1 on the placement surface 11 of the inspection area 10. Alternatively, a worker may manually place the container 1 on the placement surface 11 of the inspection area 10.

The two-dimensional camera 3 and the three-dimensional camera 4 are both installed above the inspection area 10. Specifically, the two-dimensional camera 3 and the three-dimensional camera 4 are installed at a position where these cameras can capture at least an image of the entire area of the inner bottom surface of the container 1 when placed on the placement surface 11. The two-dimensional camera 3 is, for example, an area scan camera, a line scan camera or the like. The three-dimensional camera 4 is, for example, a stereo camera, a ToF (time-of-flight) camera or the like.

The first detection device 5 is activated every time the first detection device 5 receives a detection signal from the container sensor 2. Once activated, the first detection device 5 detects whether an object remains inside the container 1. The first detection device 5 performs this function based on two-dimensional image data captured by the two-dimensional camera 3. The first detection device 5 outputs the result of detection (or information corresponding thereto) to the reporting device 7. The first detection device 5 also has a function of controlling the switch 8.

The second detection device 6 is activated every time the second detection device 6 receives a detection signal from the container sensor 2. Once activated, the second detection device 6 detects whether an object remains inside the container 1. The second detection device 6 performs this function based on three-dimensional image data captured by the three-dimensional camera 4. The second detection device 6 outputs the result of detection (or information corresponding thereto) to the reporting device 7. The second detection device 6 also outputs the result of detection (or information corresponding thereto) to the first detection device 5.

The reporting device 7 reports detection of a left-behind object to the worker based on the information from the first detection device 5 and/or the second detection device 6. The reporting device 7 is, for example, a lamp that turns on or flashes on and off when a left-behind object is detected. In other examples, the reporting device 7 can be, or include, a buzzer that outputs a warning sound when a left-behind object is detected. The reporting device 7 may be a combination of a lamp and a buzzer. Alternatively, the reporting device 7 may be combined with another device such as a display screen. The reporting device 7 may perform another reporting operation when a left-behind object is not detected. In the example, a worker can be an employee or a supervisor who is in charge of the work of packing items to be shipped into the container 1 at a warehouse or the like. Once the worker knows that there is no left-behind object in the container 1, based on the reporting state of the reporting device 7, the worker packs the container 1 with items, products, goods, merchandise, commodities, components, parts, or the like.

The switch 8 is for switching between providing information representing whether to enable the result of left-behind object detection from the first detection device 5, to the reporting device 7, and providing information representing the result of left-behind object detection from the second detection device 6, to the reporting device 7. The connection state of the switch 8 that provides information from the first detection device 5 to the reporting device 7 is defined as a first state. The connection state of the switch 8 that provides the information from the second detection device 6 to the reporting device 7 is defined as a second state. The switch 8 is in the second state by default as shown in FIG. 1. If the switch 8 in the second state receives a switch control signal from the first detection device 5, the switch 8 switches into the first state.

The second detection device 6 detects a left-behind object in the container 1, based on three-dimensional image data. For example, the second detection device 6 slices out an image showing the inner bottom surface of the container 1 from the three-dimensional image data and checks whether the image is a planar image free of surface unevenness. If the image of the inner bottom surface is a planar image, the second detection device 6 determines that there is no left-behind object in the container 1. The second detection device 6 outputs information representing the result of detection to the effect that there is no left-behind object, to the reporting device 7 and the first detection device 5. However, if the image of the inner bottom surface is a non-planar image with surface unevenness, the second detection device 6 determines that there is a left-behind object in the container 1. The second detection device 6 outputs information representing the result of detection to the effect that there is a left-behind object, to the reporting device 7 and the first detection device 5.

In this way, the second detection device 6 detects a left-behind object in the container 1, based on three-dimensional image data including information corresponding to the direction of height. Therefore, the second detection device 6 can detect a left-behind object with high accuracy. However, the three-dimensional camera 4, which is costly, is needed and therefore increases the overall cost of the left-behind object detection system 100.

The procedure of image processing to detect a left-behind object in the container 1, based on three-dimensional image data, is not limited to this example. Other known procedures can be employed to detect a left-behind object in the container 1, based on three-dimensional image data.

The first detection device 5 detects a left-behind object in the container 1 based on two-dimensional image data. The first detection device 5 uses a learning model in order to detect a left-behind object in the container 1, based on two-dimensional image data that includes no information corresponding to the direction of height.

Recently, with the progress in AI (artificial intelligence) technologies, it has become easier to generate a learning model. A learning model is constructed to enable appropriate estimation based on a machine learning algorithm fed with teaching data. As a machine learning algorithm, an algorithm for deep learning using a neural network can be used, for example. That is, carrying out deep learning using two-dimensional image data of the container 1 captured by the two-dimensional camera 3 and a known indication of whether there is a left-behind object in the container 1 or not, as teaching data, enables generation of a learning model used for left-behind object inspection. The first detection device 5 uses such a learning model for left-behind object inspection. The first detection device 5 detects a left-behind object in the container 1, using this learning model. It can also be said that the first detection device 5 estimates a left-behind object in the container 1, using the learning model.

The accuracy of left-behind object detection using a learning model depends on the learning achievement level of the learning model. The accuracy improves as the learning achievement level rises. As the learning achievement level converges, the accuracy improves to such a level that a very reliable result equivalent to that in the case of using the three-dimensional camera 4 is acquired.

To describe in another way, if the learning achievement level of the learning model is low, the accuracy of left-behind object detection is low. However, the two-dimensional camera 3 is generally much less costly than the three-dimensional camera 4. Therefore, if the three-dimensional camera 4 can be eliminated from the left-behind object detection system 100 the overall cost of the system can be reduced. That is, if a system with just the first detection device 5 for detecting a left-behind object but with high accuracy achieved by using a learning model with a converged learning achievement level can be constructed, a left-behind object detection system that achieves accuracy equivalent to that of a system having the three-dimensional camera 4 can be provided but at lower cost. To this end, the learning model provided in the first detection device 5 needs to learn until its achievement level converges. The first detection device 5 has a function of causing the learning model to learn until its achievement level converges.

Figure 2:
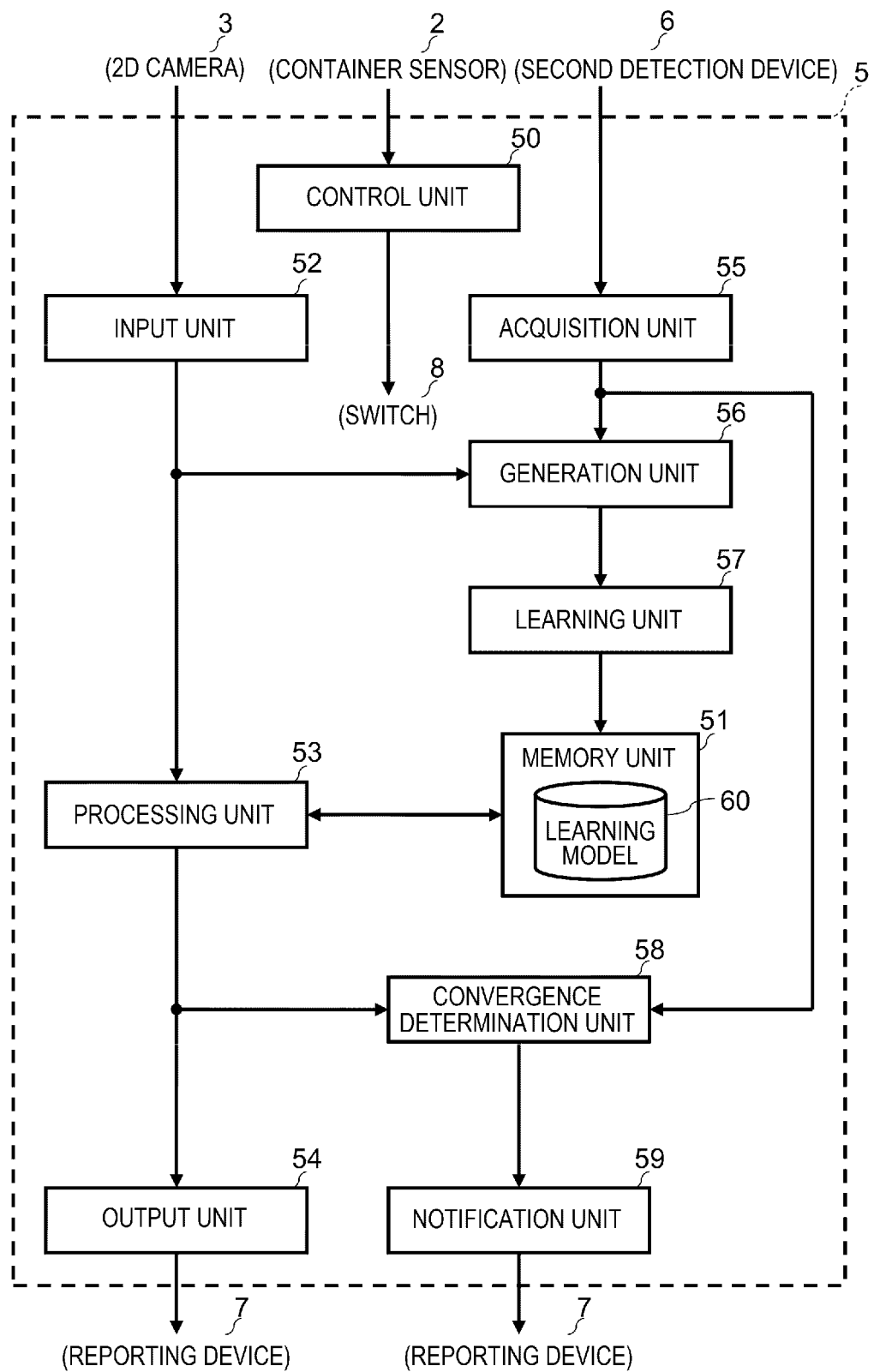
FIG. 2 is a block diagram of a first detection device according to an embodiment.

FIG. 2 is a block diagram of the first detection device 5. The first detection device 5 includes at least a control unit 50, a memory unit 51, an input unit 52, a processing unit 53, an output unit 54, an acquisition unit 55, a generation unit 56, a learning unit 57, a convergence determination unit 58, and a notification unit 59.

The control unit 50 (controller) is activated upon receiving a detection signal from the container sensor 2. The control unit 50 controls functions of the memory unit 51, the input unit 52, the processing unit 53, the output unit 54, the acquisition unit 55, the generation unit 56, the learning unit 57, the convergence determination unit 58, and the notification unit 59 according to a preset control program. Under such control, the first detection device 5 detects a left-behind object in the container 1, based on two-dimensional image data captured by the two-dimensional camera 3. The control unit 50 also issues a control signal to be transmitted to the switch 8. The control unit 50 can comprise, for example, a processor, such as a CPU (central processing unit) and a main memory including a ROM (read-only memory) and a RAM (random-access memory).

The memory unit 51 is an area for storing various data including a learning model 60 for left-behind object detection and various flags described later. The memory unit 51 is formed of, for example, a memory device such as an EEPROM (electrically erasable programmable read-only memory), an HDD (hard disk drive) or an SSD (solid-state drive), or a combination of a plurality of these memories.

The input unit 52 acquires two-dimensional image data from the two-dimensional camera 3. The input unit 52 outputs the two-dimensional image data to the processing unit 53 and the generation unit 56. The input unit 52 comprises, for example, an interface that can communicate data with the two-dimensional camera 3 in conformity with a predetermined communication protocol such as a USB (universal serial bus) interface.

The processing unit 53 executes processing for detecting a left-behind object in the container 1, using the two-dimensional image data and the learning model 60. If a left-behind object is detected, the processing unit 53 outputs information indicating that there is a left-behind object, to the output unit 54 and the convergence determination unit 58. If a left-behind object is not detected, the processing unit 53 outputs information indicating that there is no left-behind object, to the output unit 54 and the convergence determination unit 58.

The output unit 54 outputs the information representing the result of detection to the reporting device 7 either indicating that there is a left-behind object or that there is no left-behind object, as acquired from the processing unit 53. The information outputted from the output unit 54 is provided to the reporting device 7 when the switch 8 is in the first state. That is, the information representing the result of detection is enabled. When the switch 8 is in the second state, the information is not provided to the reporting device 7. That is, reporting of the information representing the result of detection is disabled. In the description below, the result of detection indicating that there is a left-behind object or there is no left-behind object, acquired based on the two-dimensional image data from the processing unit 53, is referred to as a result of detection A.

The acquisition unit 55 acquires information from the second detection device 6 indicating whether there is a left-behind object or not based on the three-dimensional image data. The acquisition unit 55 outputs this information to the generation unit 56 and the convergence determination unit 58. In the description below, the result of detection indicating that there is a left-behind object or there is no left-behind object, as acquired by the acquisition unit 55 based on the three-dimensional image data, is referred to as a result of detection B.

The generation unit 56 generates teaching data for the learning model 60, based on the two-dimensional image data supplied from the input unit 52 and the information representing the result of detection B supplied from the acquisition unit 55. That is, the generation unit 56 uses the two-dimensional image data as input data to the learning model 60 and the information representing the result of detection B as correct answer data to the input data, and thus generates teaching data based on the combination of the input data and the correct answer data. The generation unit 56 outputs the teaching data to the learning unit 57. The teaching data is also referred to as training data, learning data or the like.

The learning unit 57 executes deep learning with the learning model 60 stored in the memory unit 51, using the teaching data generated by the generation unit 56, and thus updates the learning model 60. Deep learning can be executed, for example, by using a neural network as a deep learning algorithm. Deep learning may be executed using other algorithms.

The convergence determination unit 58 determines whether the learning achievement level of the learning model 60 has converged, based on the information representing the result of detection A supplied from the processing unit 53 and the information representing the result of detection B supplied from the acquisition unit 55.

Generally, the learning achievement level of the learning model 60 increases as deep learning is repeated. As the learning achievement level rises, the accuracy rate of the result of detection A from the processing unit 53 detecting a left-behind object using the learning model 60 increases. However, the result of detection B is the result of detection by the second detection device 6 detecting a left-behind object based on the three-dimensional image data. It can be assumed that the result of detection B by the second detection device 6 will be substantially correct. Therefore, as the learning achievement level of the learning model 60 rises, the probability increases that the result of detection A and the result of detection B coincide with each other. The convergence determination unit 58 determines that the learning achievement level has converged when the probability of coincidence between the result of detection A and the result of detection B is close to 100% or, most preferably, is equal to 100%. On determining that the learning achievement level has converged, the convergence determination unit 58 outputs information representing the result of the determination to the notification unit 59.

The notification unit 59 outputs the information supplied from the convergence determination unit 58 to the reporting device 7. At this point, if the switch 8 has turned to the first state from the second state under the control of the control unit 50, the reporting device 7 is notified of the information representing that the learning achievement level has converged. On receiving this notification, the reporting device 7 reports that the learning achievement level of the learning model 60 has converged. For example, the reporting device 7 reports by turning on a lamp indicating that the learning achievement level of the learning model 60 has converged. Alternatively, the reporting device 7 reports by making a buzzer go off indicating that the learning achievement level of the learning model 60 has converged.

Figure 3:
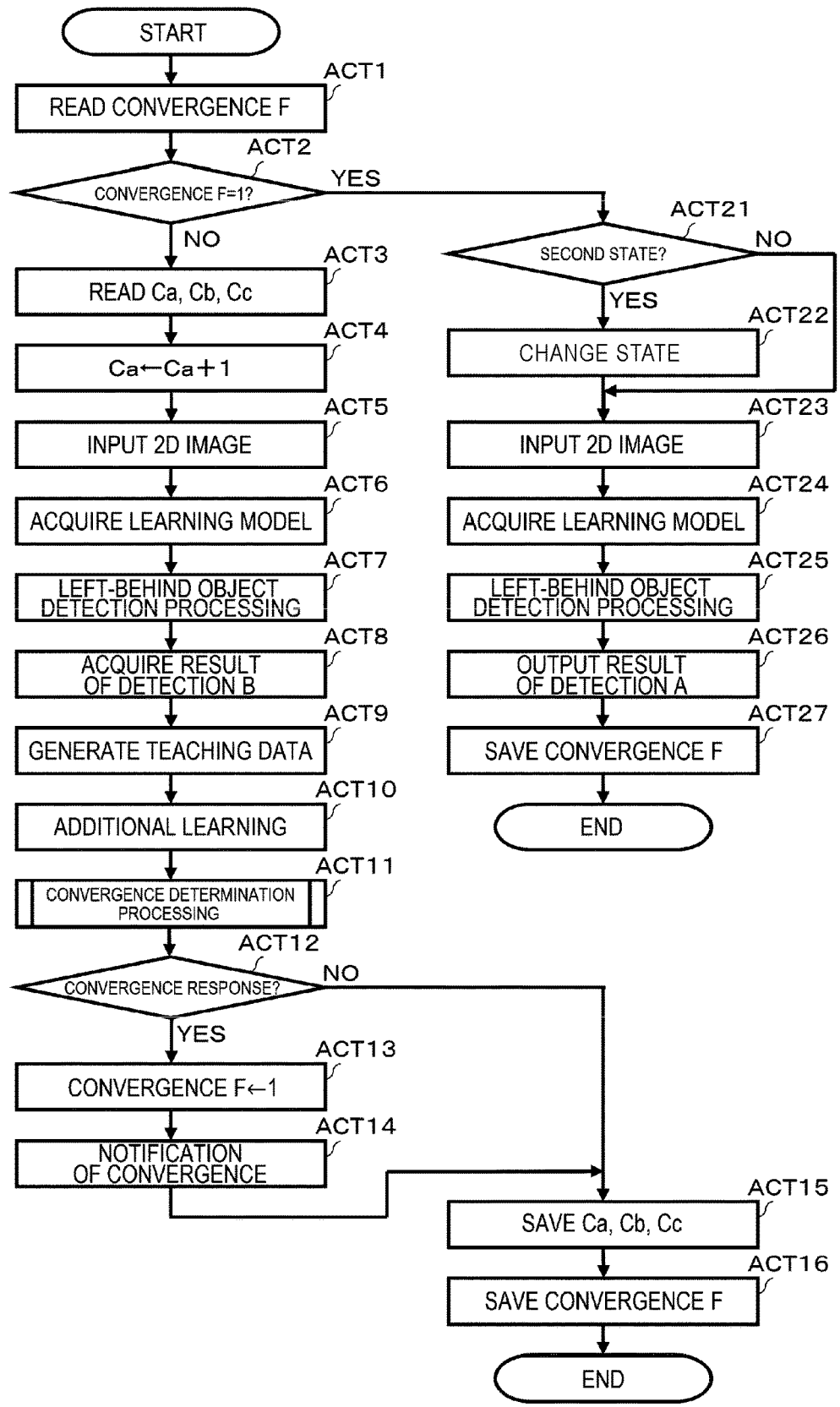
FIG. 3 is a flowchart of control procedures executed in a control unit according to an embodiment.
Figure 4:
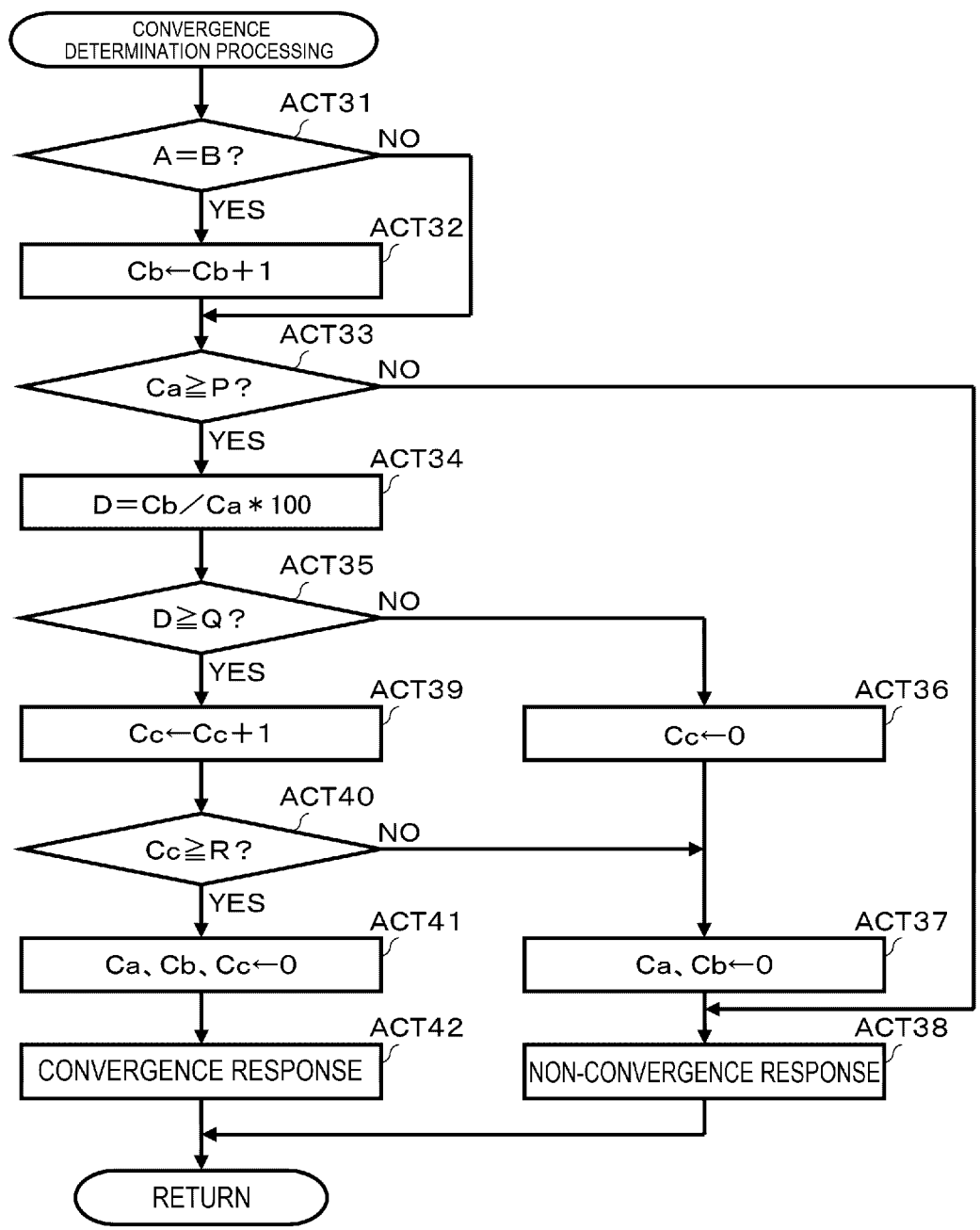
FIG. 4 is a flowchart of processing procedures executed by a convergence determination unit according to an embodiment.

FIG. 3 is a flowchart of main control procedures executed by the first detection device 5. FIG. 4 is a flowchart of main processing procedures executed by the first detection device 5. Operations of the left-behind object detection system 100 will now be described using these flowcharts. The operations described below are simply examples. The operation procedures may be suitably changed.

When the container 1 is placed in the inspection area 10, the container sensor 2 outputs a detection signal to the first detection device 5 and the second detection device 6. In response to this detection signal, the second detection device 6 detects a left-behind object in the container 1 based on three-dimensional image data captured by the three-dimensional camera 4. The second detection device 6 outputs information representing the result of detection B of the left-behind object to the reporting device 7 and the first detection device 5.

Similarly, in response to the detection signal, the control unit 50 of the first detection device 5 starts the procedures shown in the flowchart of FIG. 3. This control is based on the programs stored in a ROM or the memory unit 51 or the like.

First, in ACT 1, the control unit 50 reads a convergence flag F stored in the memory unit 51. In ACT 2, the control unit 50 examines the state of the convergence flag F. The convergence flag F is 1-bit data that is "0" if the learning achievement level of the learning model 60 has not converged and "1" if the learning achievement level has converged.

If the convergence flag F is "0", that is, if the learning achievement level of the learning model 60 has not converged (No in ACT 2), the process proceed to ACT 3. In ACT 3, the control unit 50 reads a first counter Ca, a second counter Cb, and a third counter Cc stored in the memory unit 51. In ACT 4, the control unit 50 increases the count value of the first counter Ca by "1".

In ACT 5, the control unit 50 controls the input unit 52 to provide two-dimensional image data captured by the two-dimensional camera 3 to the processing unit 53. In ACT 6, the control unit 50 acquires the learning model 60 saved in the memory unit 51 and provides the learning model 60 to the processing unit 53. The control unit 50 then controls the processing unit 53 to execute left-behind object detection processing.

Under this control, the processing unit 53 inputs the two-dimensional image data to the learning model 60 and causes the learning model 60 to estimate whether there is a left-behind object inside the container 1. The processing unit 53 then outputs information representing the result of detection A indicating that there is a left-behind object or that there is no left-behind object, to the output unit 54 and the convergence determination unit 58.

In ACT 8, the control unit 50 controls the acquisition unit 55 to acquire the result of detection B by the second detection device 6. Under this control, the acquisition unit 55 acquires the result of left-behind object detection B by the second detection device 6 with respect to the container 1 shown in the two-dimensional image data inputted via the input unit 52. The acquisition unit 55 then outputs information representing the result of detection B to the generation unit 56 and the convergence determination unit 58.

In ACT 9, the control unit 50 controls the generation unit 56 to generate teaching data. Under this control, the generation unit 56 generates teaching data based on the two-dimensional image data provided from the input unit 52 and the information representing the result of detection B provided from the acquisition unit 55. The generation unit 56 then outputs the teaching data to the learning unit 57.

In ACT 10, the control unit 50 controls the learning unit 57 to execute additional learning. Under this control, the learning unit 57 executes deep learning with the learning model 60 saved in the memory unit 51 using the teaching data generated by the generation unit 56. This deep learning adds the teaching data to the learning model 60 and thus updates the learning model 60.

On completion of the additional learning, the control unit 50 provides the count values of the first counter Ca, the second counter Cb, and the third counter Cc to the convergence determination unit 58. Then, in ACT 11, the control unit 50 controls the convergence determination unit 58 to execute the convergence determination processing shown in FIG. 4.

That is, in ACT 31, the convergence determination unit determines whether the result of detection A and the result of detection B coincide with each other. If the result of detection A and the result of detection B coincide with each other (YES in ACT 31), the process proceeds to ACT 32. In ACT 32, the convergence determination unit 58 increases the count value of the second counter Cb by "1". If the result of detection A and the result of detection B do not coincide with each other (NO in ACT 31), the convergence determination unit 58 gives NO in ACT 31 and skips the processing of ACT 32.

After executing or skipping the processing of ACT 32, the convergence determination unit 58 in ACT 33 checks whether the count value of the first counter Ca has reached a prescribed value P. The first counter Ca is a counter with its count value increased by "1" each in ACT 4. That is, the first counter Ca is a counter for counting the number of times of inspection on whether there is a left-behind object in the container 1. The convergence determination unit 58 does not determine the learning achievement level of the learning model 60 until the number of times of inspection reaches a predetermined number of times, for example, 100. That is, the prescribed value P is the value of the number of times of inspection that serves as a threshold as to whether to determine the learning achievement level.

If the count value of the first counter Ca has not reached the prescribed value P (NO in ACT 33), the convergence determination unit 58 does not determine the learning achievement level, and the process proceeds to ACT 38. In ACT 38, the convergence determination unit 58 notifies the control unit 50 of a non-convergence response signal. Then, the convergence determination unit 58 ends the convergence determination processing.

If the count value of the first counter Ca has reached the prescribed value P (YES in ACT 33), the process proceeds to ACT 34. In ACT 34, the convergence determination unit calculates the accuracy rate D (%) of the result of detection A based on the following equation (1) using the count values of the first counter Ca and the second counter Cb:

$$D=(Cb/Ca)*100 \tag{1}$$

The first counter Ca shows the number of times of inspection on whether there is a left-behind object in the container 1 as described above. The second counter Cb is a counter with its count value increased by "1" each in ACT 32. That is, the second counter Cb is a counter for counting the number of times the result of detection A and the result of detection B are equal. The result of detection B is the result of detection by the second detection device 6 and therefore substantially correct. That is, it can be said that the value D acquired by the equation (1) is the accuracy rate of the result of detection A using the count value of the first counter Ca as the number of samples.

In ACT 35, the convergence determination unit 58 checks whether the accuracy rate D has reached a prescribed value Q. The prescribed value Q is an accuracy rate recognized as indicating that it is probable that the learning achievement level of the learning model 60 has converged. The prescribed value Q is a value that is close to "100". It is preferable that the prescribed value Q is "100".

If the accuracy rate D has not reached the prescribed value Q (No in ACT 35), the learning achievement level of the learning model 60 has not converged, and the process proceeds to ACT 36. In ACT 36, the convergence determination unit 58 resets the third counter Cc to "0". The convergence determination unit 58 also resets the first counter Ca and the second counter Cb to "0" in ACT 37. In ACT 38, the convergence determination unit 58 notifies the control unit 50 of a non-convergence response signal. Then, the convergence determination unit 58 ends the convergence determination processing.

If the accuracy rate D has reached the prescribed value Q (YES in ACT 35), it is probable that the learning achievement level of the learning model 60 has converged. Thus, the process proceeds to ACT 39. In ACT 39, the convergence determination unit 58 increases the count value of the third counter Cc by "1". In ACT 40, the convergence determination unit 58 checks whether the count value of the third counter Cc has reached a prescribed value R.

The third counter Cc counts the number of times of the accuracy rate D has reached the prescribed value Q. For example, on the assumption that the determination that the learning achievement level of the learning model 60 has converged can be finalized if the accuracy rate D has reached the prescribed value Q three times consecutively, the prescribed value R is "3".

If the count value of the third counter Cc has not reached the prescribed value R (NO in ACT 40), the determination that the learning achievement level of the learning model 60 has converged cannot be finalized. Thus, the process proceeds to ACT 37. In ACT 37, the convergence determination unit 58 resets the first counter Ca and the second counter Cb to "0". The convergence determination unit 58 does not reset the third counter Cc. Subsequently, in ACT 38, the convergence determination unit 58 notifies the control unit 50 of a non-convergence response signal. Then, the convergence determination unit 58 ends the convergence determination processing.

If the count value of the third counter Cc has reached the prescribed value R (YES in ACT 40), the determination that the learning achievement level of the learning model has converged can be finalized. Thus, the process proceeds to ACT 41. In ACT 41, the convergence determination unit 58 resets all of the first counter Ca, the second counter Cb, and the third counter Cc to "0". In ACT 42, the convergence determination unit 58 notifies the control unit 50 and the notification unit 59 of a convergence response signal. Then, the convergence determination unit 58 ends the convergence determination processing.

Referring back to FIG. 3, after causing the convergence determination unit 58 to execute the convergence determination processing, the control unit 50 in ACT 12 waits for a response signal from the convergence determination unit 58. Upon receipt of a non-convergence response signal (NO in ACT 12), the process proceeds to ACT 15. In ACT 15, the control unit 50 saves the count values of the first counter Ca, the second counter Cb, and the third counter Cc in the memory unit 51. In ACT 16, the control unit 50 saves the convergence flag F in the memory unit 51. Then, the control unit 50 ends the control based on the procedures shown in the flowchart of FIG. 3.

Upon receipt of a convergence response signal from the convergence determination unit 58 (YES in ACT 12), the process proceeds to ACT 13. In ACT 13, the control unit 50 changes the convergence flag F from "0" to "1". In ACT 14, the control unit 50 controls the notification unit 59 to notify that the learning achievement level of the learning model 60 has converged. Under this control, the notification unit 59 outputs information representing that the learning achievement level of the learning model 60 has converged, to the reporting device 7.

Subsequently, in ACT 15, the control unit 50 saves the count values of the first counter Ca, the second counter Cb, and the third counter Cc in RAM or the like. In ACT 16, the control unit 50 saves the convergence flag F in RAM or the like. Then, the control unit 50 ends the control based on the procedures shown in the flowchart of FIG. 3.

If the convergence flag F read from RAM of the like in the processing of ACT 1 is set to "1" (YES in ACT 2), the process proceeds to ACT 21. In ACT 21, the control unit 50 examines the present connection state of the switch 8.

If the switch 8 is in the second state (YES in ACT 21), the process proceeds to ACT 22. In ACT 22, the control unit 50 issues a control signal to the switch 8. In response to this, the switch 8 changes from the second state to the first state. If the switch 8 is in the first state (NO in ACT 21), the processing of ACT 22 is skipped. Therefore, if the convergence flag F is set to "1", the switch 8 remains in the first state.

After finishing or skipping the processing of ACT 22, the control unit 50 in ACT 23 controls the input unit 52 to provide two-dimensional image data captured by the two-dimensional camera 3 to the processing unit 53. In ACT 24, the control unit 50 acquires the learning model 60 saved in the memory unit 51 and provides the learning model 60 to the processing unit 53. In ACT 25, the control unit 50 controls the processing unit 53 to execute left-behind object detection processing.

Under this control, the processing unit 53 inputs the two-dimensional image data to the learning model 60 and causes the learning model 60 to estimate whether there is a left-behind object inside the container 1. The processing unit 53 then outputs information representing the result of detection A indicating either that there is a left-behind object or there is no left-behind object to the output unit 54.

When the left-behind object detection processing by the processing unit 53 is finished, the control unit 50 in ACT 26 controls the output unit 54 to output information representing the result of detection A to the reporting device 7. Under this control, the output unit 54 outputs the information representing the result of detection A to the reporting device 7 via the switch 8 in the first state. Thus, the reporting device 7 reports the result of detection A.

After controlling the output unit 54, the control unit 50 in ACT 27 saves the convergence flag F in RAM or the like. Then, the control unit 50 ends the control based on the procedures shown in the flowchart of FIG. 3.

As described above, the left-behind object detection system 100 has the first detection device 5 and the second detection device 6. The first detection device 5 detects a left-behind object in the container 1 using the learning model 60 used for left-behind object inspection. The second detection device 6 detects a left-behind object in the container 1 using three-dimensional image thereof. The left-behind object detection system 100 also has the learning unit 57 causing the learning model 60 to learn the result of detection B by the second detection device 6 as a correct result.

Thus, in the left-behind object detection system 100, repeating the left-behind object detection processing with respect to the container 1 increases the learning achievement level of the learning model 60. Repeated learning of the learning model 60 enables the first detection device 5 to detect a left-behind object in the container 1 with an accuracy equivalent to that of the second detection device 6.

In this respect, the left-behind object detection system 100 has the convergence determination unit 58 determining whether the learning achievement level of the learning model 60 has converged. The left-behind object detection system 100 also has the reporting device 7. The reporting device 7 reports the result of determination by the convergence determination unit 58.

Thus, the user of the left-behind object detection system 100 can easily recognize that the learning achievement level of the learning model 60 has converged based on the reporting operation of the reporting device 7.

The left-behind object detection system 100 has the switch 8. The switch 8 enables the result of detection B by the second detection device 6 to be output to the reporting device 7 until the learning achievement level of the learning model 60 converges. When the learning achievement level of the learning model 60 has converged, the switch 8 enables the result of detection A by the first detection device 5 to be output to the reporting device 7.

That is, the result of detection B by the second detection device 6 is reported until the learning achievement level of the learning model 60 converges. When the learning achievement level of the learning model 60 has converged, the result of detection A by the first detection device 5 is reported. The result of detection B by the second detection device 6 uses three-dimensional image data and therefore is accurate. The result of detection A by the first detection device 5 using two-dimensional image data will have an accuracy equivalent to that of the second detection device 6 after the learning achievement level of the learning model 60 has converged. Therefore, the result of determination as to whether there is a left-behind object or not, as reported by the reporting device 7, can be highly reliable.

Thus, once the learning achievement level of the learning model 60 has converged, the user of the left-behind object detection system 100 can remove the three-dimensional camera 4 from the left-behind object detection system 100. The user can remove the second detection device 6 along with the three-dimensional camera 4. Removing the costly three-dimensional camera 4 from the left-behind object detection system 100 in this way can reduce the overall cost of the left-behind object detection system 100 from then on.

The learning model 60 whose learning achievement level has converged is applied to another first detection device 5. This first detection device 5 and the two-dimensional camera 3 together make up a left-behind object detection system. Thus, a left-behind object detection system that can detect a left-behind object with an accuracy equivalent to that of a left-behind object detection system using three-dimensional image data can be provided at low cost.

An embodiment of a left-behind object detection system 100 has been described. However, the present disclosure is not limited thereto.

The first detection device 5 is not necessarily limited to incorporation into a device that detects a left-behind object in the container 1 based on two-dimensional image data and using the learning model 60. Similarly, the second detection device 6 is not necessarily limited to incorporation in a device that detects a left-behind object in the container 1 based on three-dimensional image data. In general, the first detection device 5 may be any sensor device that detects an object in a container 1 using the learning model 60. Similarly, the second detection device 6 may be any device that detects an object in a container 1 by a more accurate sensor or detection technique than the first detection device 5. The learning unit 57 makes the learning model 60 learn the result of detection assuming that the second detection device 6 provides a substantially correct result.

The embodiments are described on the assumption that the first detection device 5 includes the convergence determination unit 58. However, the convergence determination unit 58 need not necessarily be contained in the first detection device 5. A dedicated device that acquires the result of detection A by the first detection device 5 and the result of detection B by the second detection device 6 and that determines whether the learning achievement level of the learning model 60 has converged based on the result of collation between the two results of detection, may be incorporated in the left-behind object detection system 100 as separate or distinct component.

The switch 8 is not necessarily required in all examples. That is, the information representing the result of detection A by the first detection device 5 and the information representing the result of detection B by the second detection device 6 may be outputted to the reporting device 7. In such a case, the reporting device 7 may report each of the two results of detection and the worker may determine whether there is a left-behind object in the container 1 based on the result of the report.

When the switch 8 is not used, the notification unit 59 may notify the reporting device 7 of whether the learning achievement level of the learning model 60 has converged. In such a case, the reporting device 7 may report whether the learning achievement level has converged. Alternatively, the reporting device 7 may report the result of detection B by the second detection device 6 until the learning achievement level converges, and may report the result of detection A by the first detection device 5 after the learning achievement level has converged.

The values of the prescribed values P, Q, and R used in the convergence determination processing are merely examples. Any value that is considered to achieve the effects of the embodiments may be used.

In the example embodiments, in ACT 8 to ACT 11, every time the result of detection B is acquired, the control unit 50 generates teaching data, performs additional learning, and executes convergence determination processing. Normally, additional learning takes a significantly longer time than a basic left-behind object inspection. Thus, in another embodiment, additional learning might not be performed until a predetermined number of teaching data examples has been generated. When the predetermined number of teaching data examples has been generated, the control unit 50 performs the additional learning with the teaching data and executes convergence determination processing. Thus, the processing efficiency of the control unit 50 can be improved.

The left-behind object detection system 100 is described as a system for detecting a left-behind object in a container for transport. However, the container that is evaluated is not limited thereto. The system described herein can be applied to any type of container in which an object may be stored.

While some embodiments have been described, these embodiments are presented simply as examples and are not intended to limit the scope of the disclosure. These novel embodiments can be carried out in various other forms and can include various omissions, replacements, and modifications without departing from the spirit and scope of the disclosure. These embodiments and the modifications thereof are included in the scope of the disclosure and also included in the scope of the claims and equivalents thereof.

What is claimed is:

1. An object detection system, comprising:
a first detection device configured to:
control a first camera to acquire a first image of a container, and
detect an object in the container based on a learning model to which the first image is supplied as input; and
a second detection device configured to:
control a second camera to acquire a second image of the container, the second image including more data than the first image,
detect the object in the container based on the second image, and
output a detection result, wherein
the first detection device is further configured to:
train the learning model using the detection result from the second detection device as a correct detection result.

2. The object detection system according to claim 1, further comprising:
a sensor configured to output a signal to the first and second detection devices when the container is placed in a predetermined area.

3. The object detection system according to claim 1, wherein the first image is a two-dimensional image.

4. The object detection system according to claim 3, wherein the second camera is a stereoscopic camera, and the second image is a three-dimensional image.

5. The object detection system according to claim 1, wherein the first detection device is further configured to determine whether a learning achievement level of the learning model has reached a predetermined threshold level.

6. The object detection system according to claim 5, wherein the second detection device can be disconnected after the learning achievement level has reached the predetermined threshold level.

7. The object detection system according to claim 5, wherein the first detection device is further configured to, when the learning achievement level has reached the predetermined threshold level, output a detection result based on the learning model being supplied with the first image.

8. The object detection system according to claim 7, further comprising:
a reporting device configured to report detection results from either the first detection device or the second detection device.

9. The object detection system according to claim 8, wherein the detection result that is output by the second detection device is reported until the learning achievement level has reached the predetermined threshold level.

10. The object detection system according to claim 8, further comprising:
a switch configured to switch between a first state in which the detection result from the first detection device is transmitted to the reporting device and a second state in which the detection result from the second detection device is transmitted to the reporting device.

11. The object detection system according to claim 10, wherein the first detection device is further configured to control the switch to be in the first state after the learning achievement level has reached the predetermined threshold level.

12. The object detection system according to claim 11, wherein the first detection device is further configured to control the switch to be in the second state until the learning achievement level reaches the predetermined threshold level.

13. An object detection apparatus, comprising:
a first detection device configured to detect an object in a container based on output from a first type sensor and a learning model to which the output from the first type sensor is supplied; and
a deep learning unit configured to supply the learning model with detection results from a second detection device configured to detect object in the container based on output from a second type sensor which is more accurate than the first type sensor, the detection results from the second detection device being consider as correct results for the learning model.

14. The object detection apparatus according to claim 13, wherein
the first type sensor is a camera acquiring a two-dimensional image, and
the second type sensor is stereoscopic camera.

15. The object detection apparatus according to claim 13, further comprising:
the second detection device.

16. The object detection apparatus according to claim 13, further comprising:
a convergence determination unit configured to determine whether detections of the object by the first detection device using the output from a first type sensor and the learning model has reached a threshold level of convergence with detections of the object from the second detection device.

17. The object detection apparatus according to claim 16, further comprising:
a switch configured to cause the detection result from the second detection device to be reported to an operator until the learning model has reached the threshold level of convergence and then cause the detection result from the first detection device to be reported to the operator after the learning model has reached the threshold level of convergence.

18. The object detection apparatus according to claim 13, further comprising:
a reporting unit configured to notify an operator of a detection result from the first detection device or the second detection device.

19. The object detection apparatus according to claim 18, wherein the reporting unit comprises a lamp.

20. An object detection method, comprising:
controlling a first camera of a first detection device to acquire a first image of a container;
controlling a second camera of a second detection device to:
acquire a second image of the container, the second image including more data than the first image,
detect a left-behind object in the container based on the second image, and
output a detection result of the left-behind object; and
controlling the first detection device to:
train a learning model for detecting the left-behind object in the container based on the first image; and detect the left-behind object in the container based on the first image using the trained learning model.

* * * * *